United States Patent Office 3,512,041
Patented May 12, 1970

3,512,041
DISPLAY DEVICE COMPRISING A MATRIX OF SELECTION ELECTRODES, FIELD EFFECT TRANSISTORS AND LUMINESCENT ELEMENTS
Claudio Dalmasso, Ivera, Italy, assignor to Ing. C. Olivetti & C., S.p.A., Ivera, Italy
Filed Sept. 25, 1967, Ser. No. 670,071
Claims priority, application Italy, Sept. 26, 1966, 35,215/66
Int. Cl. H05b 37/00, 39/00
U.S. Cl. 315—169
3 Claims

ABSTRACT OF THE DISCLOSURE

An electroluminescent display is described wherein a field effect transistor is connected to each luminescent element arranged in a contiguous mosaic comprising a light emitting layer excitable by the application of a potential difference to it. The electrode means for producing an electric field to control the conductivity of the selected transistor and the consequent light emission of the corresponding luminescent element are in the form of two groups of electrically conductive lines, disposed orthogonally to form a matrix of selection electrodes. Operating means are provided to produce the electrical control field required to render selected electrodes conductive by the formation of standing waves on selected electrodes in such a way that the antinodes of a wave of suitable polarity can select a luminiscent element.

---

The present invention relates to luminescent elements for the display of information, and to display devices employing a plurality of such elements for the representation of pictures by selective excitation of independent elements forming a screen.

Various types of display device capable of representing pictures on a screen are known, and those at present most generally used are based either upon the deflection of the beam of a cathode-ray tube, or upon a matrix system providing selective activation of a luminescent screen to form the image.

Display devices which employ a cathode-ray tube have the advantage of offering a high resolution capacity, and therefore they can be used to reproduce complex geometrical figures faithfully, but they suffer the disadvantages of an intrinsic limitation of the screen dimensions and an excessive bulk, due to the depth required for the construction of the electronbeam generator and deflection system. Furthermore, they are only suitable for the reception of information in the serial mode to form required images on the screen, as a result of which the information handling rate is inherently limited.

Display devices of the second type normally consist of a matrix formed by two mutually perpendicular groups of transparent conducting lines, with an interposed layer of luminescent material.

When an appropriate potential difference is applied between a conducting line of one group and a conducting line of the other group, the luminescent screen is illuminated at the intersection of these two lines, and by selectively controlling the application of the signals to the lines it is thus possible to form various configurations on the screen.

This second group of display devices offers the advantage of displaying information supplied in the parallel mode, as a plurality of different intersections of the matrix can be selected simultaneously. Furthermore, they can be constructed in the form of a relatively thin screen. However, the presence of a capacitive effect along the conducting lines that are energised to illuminate selected points causes adjacent zones to exhibit a certain degree of illumination which, even if weak, can be the source of significant interference, and therefore necessitates additional corrective circuits.

In addition, the use of a single and continuous luminescent screen leads to halo effects around the selected luminous points.

Finally, the known systems of construction do not permit manufacture to the degree of miniaturisation now required for many electronic installations.

One object of the present invention is to avoid some or all of the shortcomings described above, to provide a simple and reliable display.

The invention consists in a luminescent element for the visual display of a piece of information, comprising a light-emitting layer excitable by the application of a potential difference, a field-effect transistor superimposed on said layer and connected to control the application of the potential difference to it, and electrode means for producing an electric field to control the conductivity of said transistor.

Preferably, a plurality of such elements are arranged in a contiguous mosaic to form the luminescent screen of a display device for the representation of information in the form of picture images.

Advantageously, the electrode means for producing an electric field to control the conductivity of the selected transistor or transistors is in the form of two groups of electrically conductive lines, disposed orthogonally to form a matrix of selection electrodes. Operating means can then be provided to produce the electrical control field required to render a selected transistor conductive by the formation of standing waves on selected electrodes in such a way that the antinode of a wave of suitable polarity can select a luminescent element. Preferably, the selection operation is effected by the forming of a negating standing wave on all the selection electrodes of one group, for example the vertical one, so that the antinodes of this wave appearing at the associated field-effect transistors are of such a polarity as to block their conduction, whilst in the horizontal group, the one selection electrode associated with a given transistor that is to be selected has an identical standing wave opposite in phase to that of the selection electrodes of the other group.

In this way, the resulting controlling electric fields produced at the transistors by the simultaneous formation of these standing waves allows the passage of a current only across the field-effect transistor peculiar to the intersection of the unexcited vertical selection electrode and the excited horizontal one, and this transistor then supplies current to the associated layer in its luminescent element.

An element so activated will remain luminous as long as the excitation potential difference applied to it by means of the said selection is not removed, and it is possible to represent a complete picture on the screen by selectively exciting the appropriate elements. If each of the luminescent elements has a separate luminescent zone, in accordance with a preferred embodiment, a notable advantage is obtained, in that the required picture is clearly defined without ambiguity, that is, each portion of the screen corresponding to a luminescent element is either illuminated or extinguished, and there are no fringe regions partially illuminated.

The invention will now be described with reference to the accompanying drawings, in which:

FIG. 2 is a longitudinal sectional view of the embodi-display arrangement for controlling the selection matrix.

Figure 1:
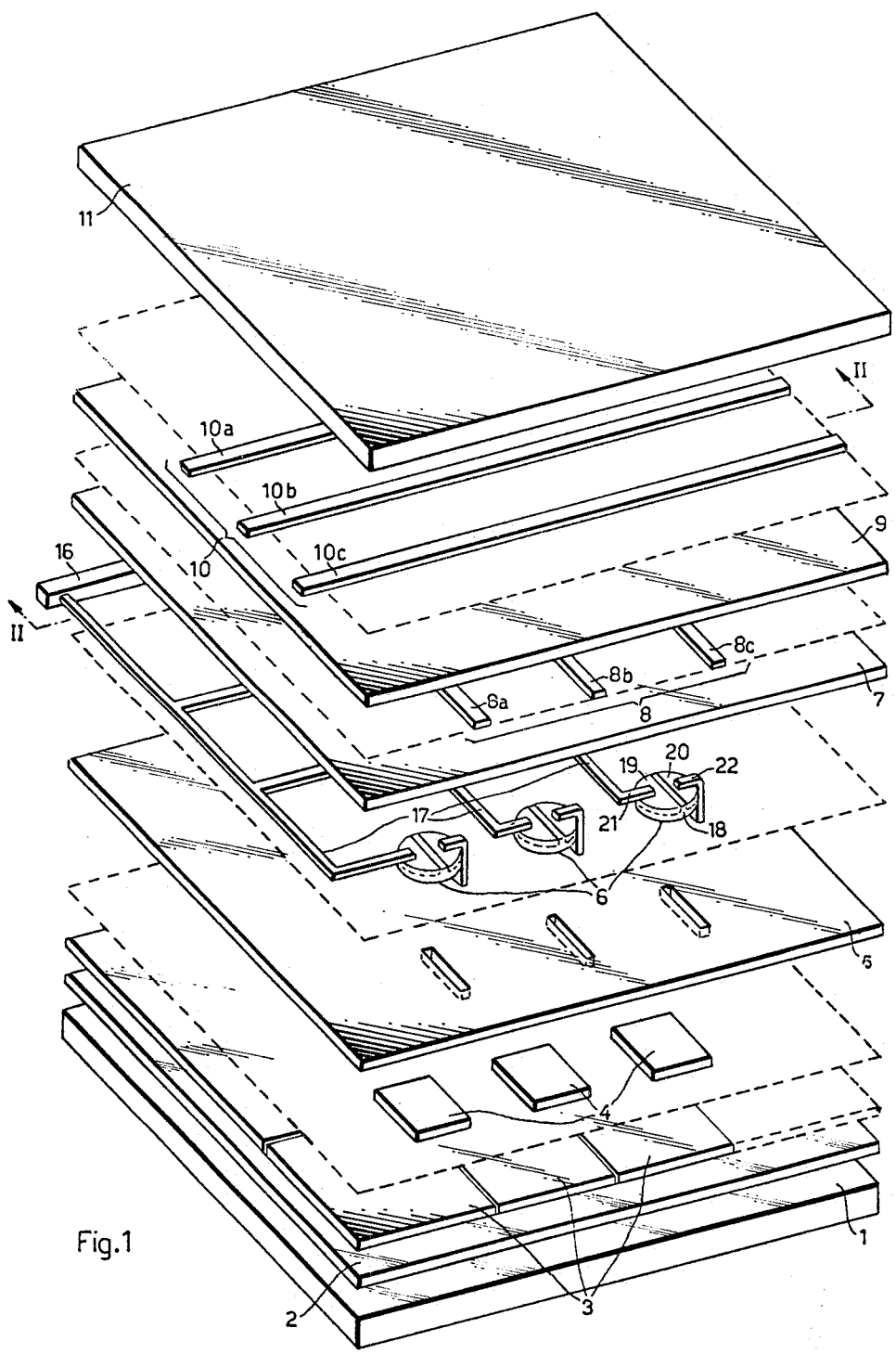
FIG. 1 is an exploded view of the element layers of an exemplary embodiment of a device according to the invention.

In FIG. 1, a protective covering layer of insulating material 11, of a thickness of, for example, 0.2 mm., is laid over two groups of selection electrodes 8 and 10, arranged orthogonally one to another with an interposed separating insulating layer 9 of a thickness of, for example, 0.01 mm., to form a matrix. Each selection electrode has a prismatic form, with dimensions of breadth and thickness equal to, for example, 0.03 and 0.01 mm. respectively.

The group 10 is constituted by a plurality of selection electrodes, of which three are shown, 10a, 10b and 10c, spaced equidistantly and disposed upon the upper surface of the insulating layer 9. Similarly, below the layer 9 three of the equidistantly spaced selection electrodes, 8a, 8b and 8c, forming the group 8, are shown.

Below the group of electrodes 8, is a further insulating layer 7, of a thickness of, for example, 0.01 mm., which covers field-effect transistors 6 insulated one from another and disposed to lie at the intersections of the matrix formed by the groups 5 and 10. Each transistor can, for example, be constituted by a small silicon p-type semiconductor plate, 18, in which are formed two n-type zones, a source 19 and a drain 20, separated one from the other, on which are disposed metallic contact electrodes, 21 and 22 respectively. In this embodiment, the usual single gate or control electrode normally superimposed upon the semiconductor plate is omitted, as its function is taken over by the selection electrodes of the matrix, which form an intersection at each transistor.

The source electrodes 21 of the field-effect transistors are all connected in parallel through a system of common supply lines 17 to a main bus-bar 16, which is thus able to supply excitation through the transistors of all the elements.

The drain electrodes 22 of the transistors pass through holes suitably disposed in an underlying insulating layer 5, of a thickness of, for example, 0.01 mm., and are connected electrically with the corresponding electrodes 4 of a matrix of individual excitation electrodes, one for each of the luminescent elements, spaced from the matrix of the transistors 6 by the said insulating layer 5.

In this exemplary embodiment, each excitation electrode 4 has the shape of a parallelepiped having a square base of sides of 0.12 mm., and a height equal to 0.05 mm., the distance between the centres of adjacent electrodes being 0.2 mm.

Each excitation electrode 4 of the matrix is superimposed upon a stratiform light-emitting layer element 3, constituted by a dielectric, with included luminescent phosphur particles, and having a thickness of, for example, 0.05 mm., which lie against a transparent conducting plate 2, likewise 0.05 mm. thick, this plate functioning as a common second excitation electrode for all the luminescent elements. Alternatively, the luminescent element can employ a light-emitting diode, such as a gallium arsenide diode.

Beneath this common plate 2, there lies a support formed by a glass plate 1, having a thickness of, for example, 3 mm.

Figure 2:
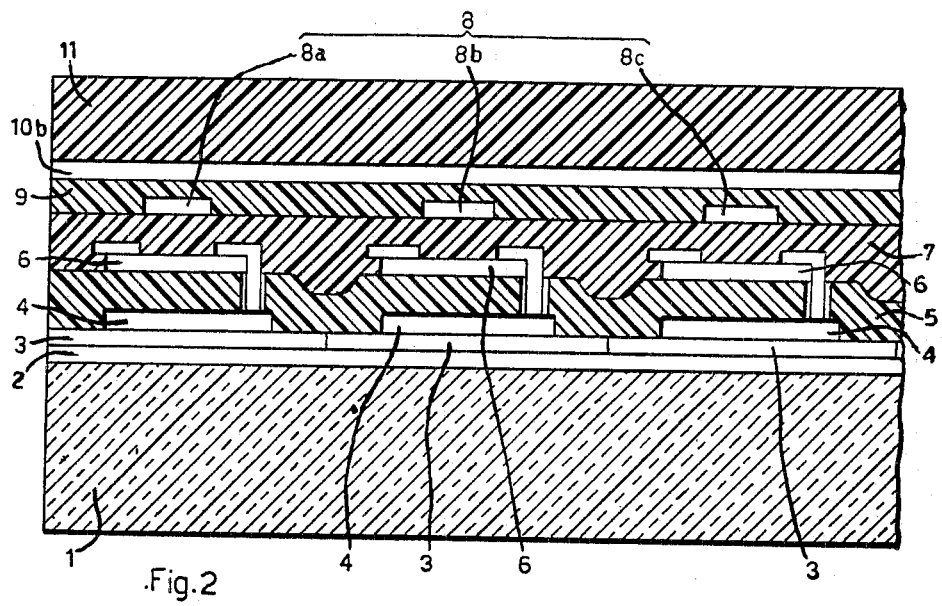
FIG. 2 is a longitudinal sectional view of the embodiment shown in FIG. 1, on an enlarged scale.

In FIG. 2, the assembled device is shown.

Figure 3:
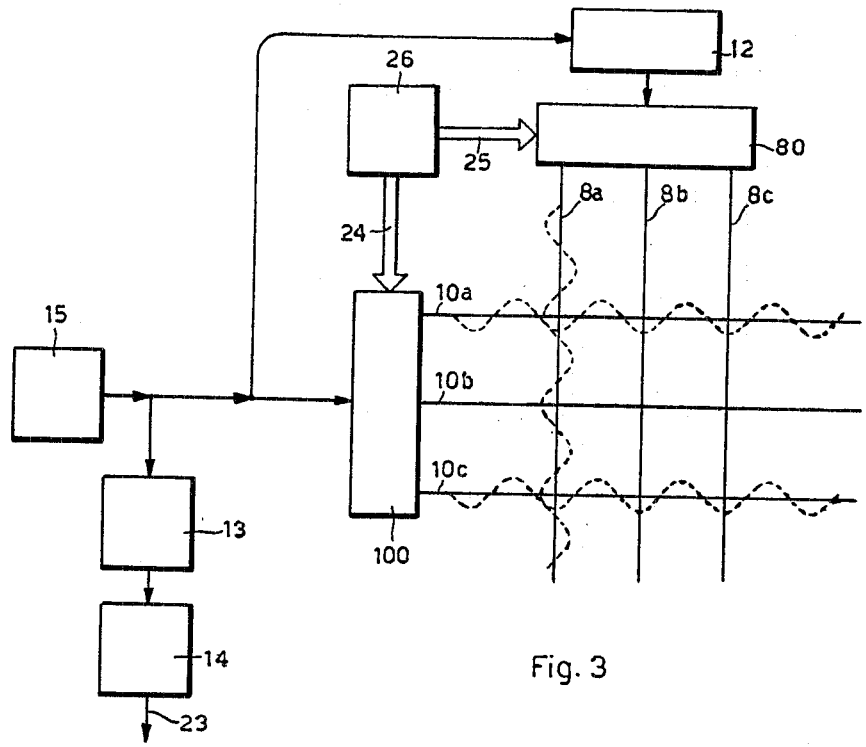
Figure 4:
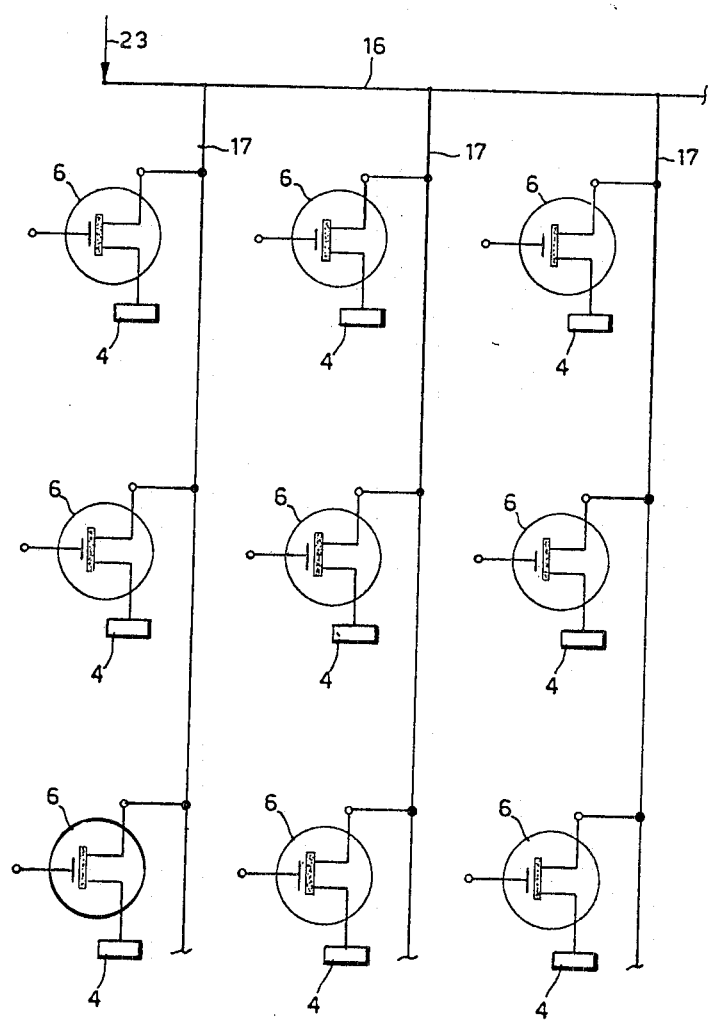
FIG. 4 illustrates diagrammatically the signal feeding circuits for the various field-effect transistors within the device.

A preferred arrangement for the operation of this embodiment of the display device is shown in FIGS. 3 and 4. It is assumed that a certain moment the point corresponding to the intersection of the two selection electrodes 8a and 10b (FIG. 3) is to be illuminated on the screen.

A suitable oscillator 15 generates sinusoidal waves which are fed by way of a line selector 100 to the electrodes 10a and 10c, but not to the selected electrode 10b, on which the point which is to be selected lies. The frequency of the said wave is chosen relative to the transmission characteristics of the selection electrodes 10 in such a way as to give rise to standing waves on the said selection electrodes having antinodes corresponding to the points of intersection of the matrix. In operation, these form negating standing waves, presenting at the points of intersection with the other group 8 of orthogonally disposed selection electrodes, an antinode of such a polarity that the electric field generated blocks the conduction of the field-effect transistor subtending the intersection.

Simultaneously, the waveform produced by the oscillator 15 is fed via a phase-shifting network 12 which displaces it by 180°, to a column selector 80 having a structure and function similar to that of the selector 100, which passes this wave to the single selected electrode 8a on which the point to be selected lies. On the selection electrodes 8 this wave from the oscillator 15 again forms a standing wave having antinodes located at the points of intersection of the matrix.

Given the said phase displacement, the resulting polarity of the said antinodes is such that, in operation, the electric field deriving from this wave, corresponding to each field-effect transistor, is such as to allow the passage of the current in the said transistor.

Therefore, the resulting overall electric field, in the said instant, acts in such a way as to allow the passage of the current only in the individual field-effect transistor at the intersection of the line 10b and the column 8a at present selected, whilst the field produced at the other transistors identified with pairs of lines not simultaneously selected, is either a null or has a blocking value.

The waveform produced by the oscillator 15 is also led to a timing circuit, constituted in this example by a rectifier 13 and a gate 14, formed by an amplitude discriminator followed by an amplifier which produces at the outlet 23 a timing signal corresponding to the individual positive crests of the said wave.

This timing signal is fed from the outlet 23 to the bus-bar 16 as a supply signal for the source electrodes 21 of the transistors.

As has been stated, this supply signal is led in parallel to all the field-effect transistors, but can only pass across that one, individual to the line 10b and to the column 8a actually selected, which is not cut off, so that excitation is applied only to that electrode 4 of the luminescent element employing that transistor.

From the above, it is clear that the use of a supply signal having the above mentioned impulse timing permits the limitation of the periods in which the transistors can be conductive to those half-cycles in which the standing waves have the correct polarity to activate the required transistors.

When a selected transistor conducts, a potential difference is applied between the associated excitation electrode 4 and the common conductive plate 2, to activate the luminescent layer of the element corresponding to the pre-selected point.

From the above, it is clear that a certain luminescent element of the matrix becomes excited by the simultaneous presence of a standing wave on the only vertical line to which the element belongs, and the absence of a standing wave on the only horizontal line to which the said element belongs. It is therefore evident that the selector 80 can be operated to simultaneously form standing waves on several vertical lines of the group 8, and the selector 100 can be operated to suppress the formation of negating standing waves on several horizontal lines of the group 10, so that it is possible to excite several luminescent elements of the mosaic simultaneously. Thus, by suitably controlling the selectors 80 and 100 by means of an information applied via lines 25 and 24 respectively from an information source 26, it is possible to represent this information on the screen.

In one alternative embodiment of the device according to the invention, the screen formed by a mosaic of distinct luminescent layer elements can be replaced by a single continuous layer of light-emitting material, in which case that part of it is activated which is subtended by the corresponding electrode 4 of the matrix of excitation electrodes, when excitation is provided via the associated transistor.

From the FIG. 2, in which the vertical dimensions have been exaggerated relative to the horizontal dimensions for convenience of representation, it will be readily seen that a display device of this type can be conveniently produced by known thin-film circuit techniques, for example by deposition.

What I claim is:

1. A display device comprising
   a plurality of luminescent elements arranged in rows and columns to form a luminescent screen, each element having a light-emitting layer excitable by the application of a potential difference,
   a field-effect transistor superimposed on said layer and connected to control the application of the potential difference to it,
   at least two groups of electrodes crossing each other corresponding to the said luminescent elements the control field of each transistor being determined conjointly by the potentials of the intersection of the selection electrodes at said transistor,
   operating means to produce said electrical control field by standing waves formed on selected electrodes, said standing waves having antinodes spaced to correspond to the intersections of the rows and columns.

2. An arrangement as claimed in claim 1, in which the selection of a given luminescent element to be excited is effected by connecting said operating means to form said standing wave to that electrode of one group of selection electrodes which corresponds to said given element, and simultaneously connecting said operating means to form negating standing waves on all the electrodes of the other group of selection electrodes except that corresponding to said given element.

3. A device as claimed in claim 2, in which said transistors are formed together with said electrodes as a stratiform structure comprising,
   two groups of selection electrodes arranged orthogonally one to another to form a matrix,
   an insulating layer,
   insulated one from another field-effect transistors disposed to lie at the intersections of said matrix with their control electrodes omitted,
   an underlying insulating layer provided with holes suitably disposed to pass the drain electrodes of said transistors,
   a matrix of excitation electrodes underlying said insulating layer and connected with the drain electrodes of said transistors,
   light-emitting elements underlying said matrix of excitation electrodes.

References Cited

UNITED STATES PATENTS

| 3,086,143 | 4/1963 | Wolfe | 315—169 |
| 3,246,162 | 4/1966 | Chin | 315—169 X |
| 3,309,610 | 3/1967 | Yamamoto | 315—169 X |
| 3,363,240 | 1/1968 | Cola et al. | 315—169 X |
| 3,379,931 | 4/1968 | Soldano | 315—169 |
| 3,388,292 | 6/1968 | Burns | 315—169 |

FOREIGN PATENTS 249,926  10/1962  Australia.

JOHN W. HUCKERT, Primary Examiner

A. J. JAMES, Assistant Examiner

U.S. Cl. X.R.

307—304; 340—173